(12) United States Patent
Jane Santamaria

(10) Patent No.: US 7,364,182 B2
(45) Date of Patent: Apr. 29, 2008

(54) FOLDABLE CHASSIS FOR BABY CARRIAGES

(75) Inventor: Manuel Jane Santamaria, Palau De Plegamans (ES)

(73) Assignee: Jane, S.A., Barcelona (ES)

( * ) Notice: Subject to any disclaimer, the term of this patent is extended or adjusted under 35 U.S.C. 154(b) by 105 days.

(21) Appl. No.: 11/483,386

(22) Filed: Jul. 6, 2006

(65) Prior Publication Data
US 2007/0035097 A1 Feb. 15, 2007

(30) Foreign Application Priority Data
Jul. 7, 2005 (ES) ............................ 200501565 U
Dec. 13, 2005 (ES) ............................ 200502696 U

(51) Int. Cl.
*B62B 7/06* (2006.01)
(52) U.S. Cl. ................... 280/642; 280/47.38; 280/639; 280/647
(58) Field of Classification Search ................ 280/638, 280/639, 642, 643, 644, 647, 648, 649, 650, 280/658, 47.38, 47.39, 47.4, 47.41
See application file for complete search history.

(56) References Cited
U.S. PATENT DOCUMENTS

| 6,561,536 | B2 * | 5/2003 | Suzuki | 280/642 |
| 6,663,122 | B1 * | 12/2003 | Lin | 280/47.38 |
| 6,830,260 | B2 * | 12/2004 | Everett | 280/642 |
| 7,044,498 | B2 * | 5/2006 | Chen | 280/642 |
| 7,077,423 | B2 * | 7/2006 | Hutchinson | 280/649 |
| 7,178,822 | B2 * | 2/2007 | Chen | 280/642 |
| 2006/0125211 | A1 * | 6/2006 | Jane Santamaria | 280/643 |
| 2006/0226635 | A1 * | 10/2006 | Huang | 280/642 |

FOREIGN PATENT DOCUMENTS

ES 1 050 104 U 3/2002

* cited by examiner

*Primary Examiner*—Christopher P. Ellis
*Assistant Examiner*—John D Walters
(74) *Attorney, Agent, or Firm*—Merchant & Gould P.C.

(57) ABSTRACT

This foldable chassis for baby carriages comprises two rear wheels (1) and (2), a front rolling support (3), and a U-shaped handlebar (4) being at the end of each of its branches (5) and (6) fitted to a respective lateral member (7) and (8), each of said lateral members being at its upper end (9) linked in a pin-jointed connection to a respective armrest (10) and (11), each of said armrests being in its turn linked in a pin-jointed connection (12) to the respective branch of the handlebar. This chassis is characterized in that each of the lateral members (7) and (8) inferiorly ends in a respective bush bearing (13) and (14), said bush bearings being both fitted on the central length of the shaft (15) being fitted to each of the wheels (1) and (2) through a respective inflected length (16) and (17), two connecting rods (18) and (19) being solidly secured to said central length of said shaft and articulatedly linked (20) to a central support (21) making up an articulated connection with the middle length of a U-shaped member having the end of each of its branches (24) and (25) linked in a pin-jointed connection to the end region (26) of the respective branch of the handlebar and an intermediary point (27) of each of its aforementioned branches linked in a pin-jointed connection to the respective one of said lateral members (7) and (8).

5 Claims, 5 Drawing Sheets

FOLDABLE CHASSIS FOR BABY CARRIAGES

FIELD OF THE INVENTION

This chassis is intended for baby carriages comprising three wheels, i.e. two rear ones and a central front one.

BACKGROUND OF THE INVENTION

Some models of this kind of baby carriages have been already known for some years which have some drawbacks such as an excessive bulk once folded, the fact that it turns out to be difficult for the person carrying the baby carriage to carry out the folding operation, and the fact that once folded these baby carriages are not fit to maintain a standing position and are thus more difficult to handle and to be put away.

Some of these problems have been already solved with the foldable pushchair for babies being the object of the Spanish Utility Model no. 200101210 (ES-1050104) being owned by this very Applicant, said foldable pushchair comprising a chassis being formed by pin-jointed members facilitating the mutual juxtaposition of the constituent members and thus allowing to obtain a compactly folded arrangement, the device maintaining the pushchair in its unfolded arrangement being easily unlocked by means of a respective control being provided at the top of each branch of the handlebar thus substantially facilitating said task for the person being about to fold the pushchair.

This pushchair at each of its sides comprises a respective side member being provided by way of armrest and being at its front end linked in a pin-jointed connection to a respective leg, said legs inferiorly converging where the front wheel is fitted, each of said side members at an intermediary point being linked in a pin-jointed connection to a respective rear leg being associated to the corresponding rear wheel, each of said side members at their back end being linked in a pin-jointed connection to an intermediary point of each of the branches of the handlebar, these latter being at their lower end linked in a pin-jointed connection to a U-shaped transverse member being laterally linked in a pin-jointed connection to the U-shaped frame for the seat and to the rear legs, the U-shaped frame of the seat being at its front ends linked in a pin-jointed connection to the front legs.

SUMMARY OF THE INVENTION

The foldable chassis being the object of the invention allows to obtain a simplified construction of the baby carriage as well as a more compactly folded arrangement of this type of baby carriages.

A characterizing feature lies for such a purpose in the fact that the rear legs have been replaced with lateral members each inferiorly ending in a respective bush bearing being fitted on the central length of the shaft being fitted to each of the rear wheels through a respective inflected length, two connecting rods being solidly attached to said central length and articulatedly linked to a central support making up an articulated connection with the middle length of a U-shaped member having the end of each of its branches linked in a pin-jointed connection to the end region of the respective branch of the handlebar and an intermediary point of each of its aforementioned branches linked in a pin-jointed connection to the respective one of said lateral members being related with the rear wheels.

An also characterizing feature lies in the fact that the central support is fitted to and longitudinally guided along the lower surface of a center sill being at its rear end fitted by means of a block bearing to the central length of the shaft being fitted to the rear wheels, said center sill at its front end comprising the arrangement of the rolling support being made up by a castoring double wheel.

In order to reinforce the rear portion of the chassis the makeup of the shaft (having the rear wheels fitted to it) being made up of a central length and two end lengths being each for each one of the wheels, said lengths being fixedly secured to each other by means of the fastening of the very connecting rods to said shaft, is secured with the presence of a cross member being provided for linking the two aforementioned bush bearings to each other.

And in order to obtain a greater stability of the chassis at the front rolling support it has been foreseen to provide it with two separate wheels being each supported by a respective short arm, said arms laterally deriving from the front end of the center sill in opposite directions.

These and other features will be best made apparent by the following detailed description whose understanding will be made easier by the accompanying five sheets of drawings showing a practical embodiment being cited only by way of example not limiting the scope of the present invention.

DETAILED DESCRIPTION

Figure 1:
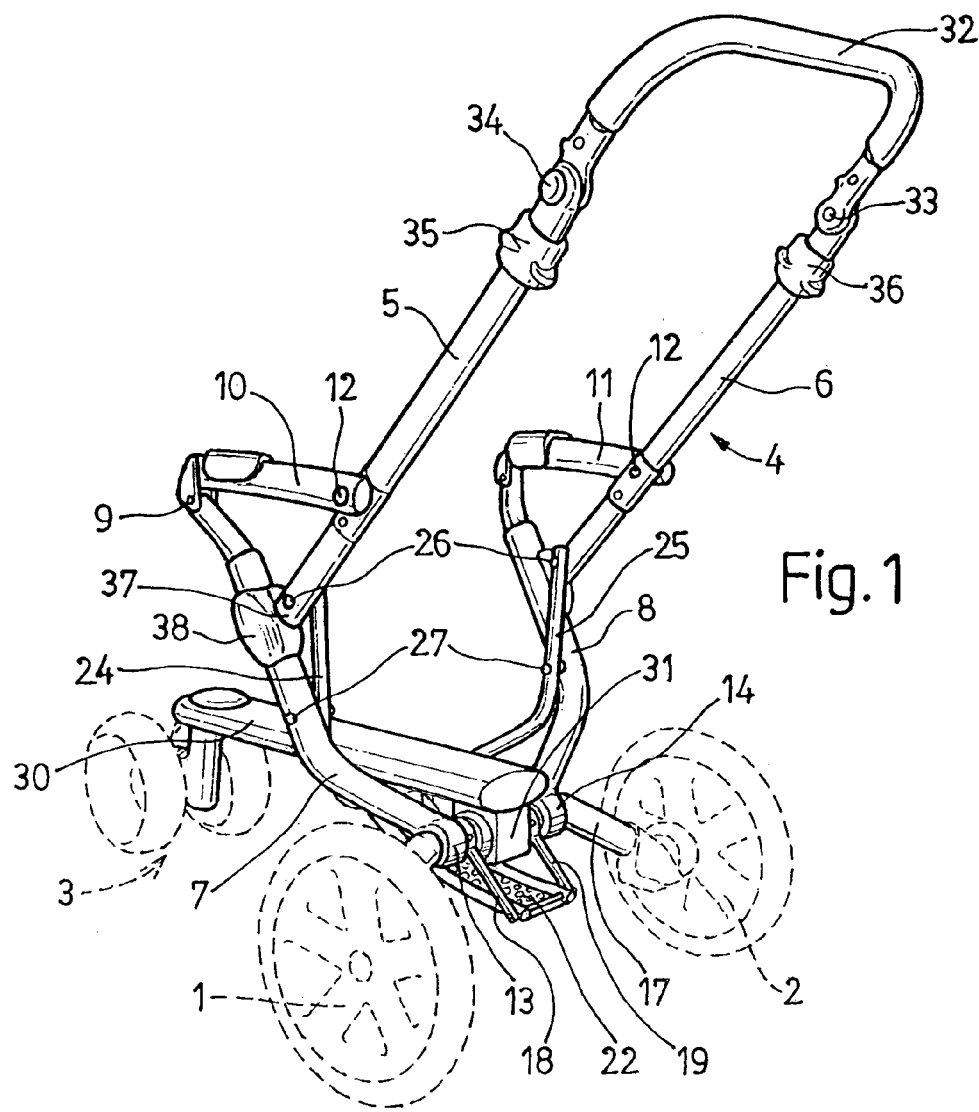
FIGS. 1 and 2 show the assembly of this chassis in an unfolded arrangement as seen in a perspective view from the rear and in a folded arrangement as seen in a side view, respectively.

According to the drawings this foldable chassis for baby carriages comprises two lateral rear wheels (1) and (2) and a centrally arranged front rolling support (3) being made up by a castoring double wheel, and a U-shaped handlebar (4) being at the end of each of its branches (5) and (6) removably fitted to an intermediary point of a respective lateral member (7) and (8), each of said lateral members being at its upper end (9) linked in a pin-jointed connection to the front end of a respective armrest (10) and (11), each of said armrests being at its rear end at the point (12) linked in a pin-jointed connection to the respective branch of the handlebar.

Figure 6:
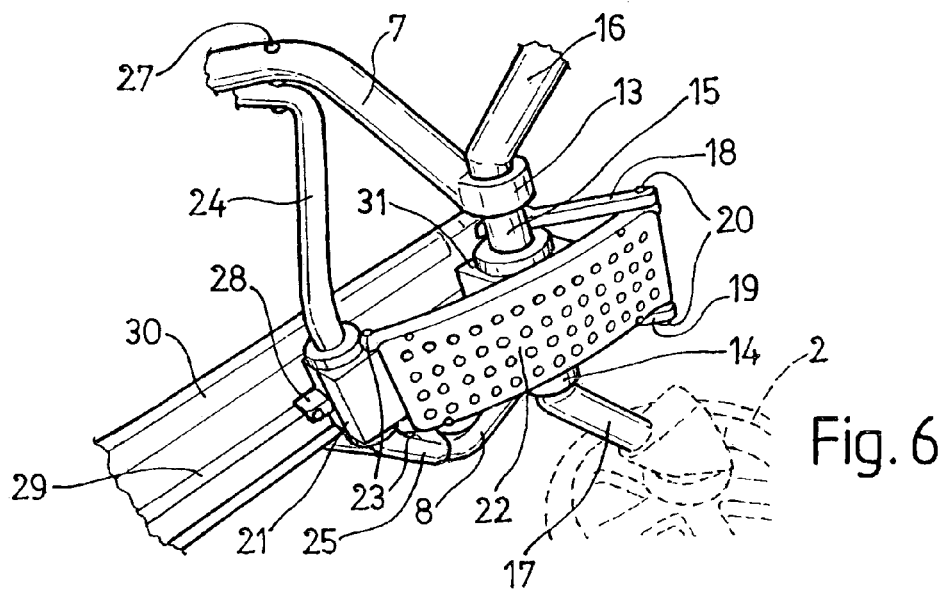
Figure 7:
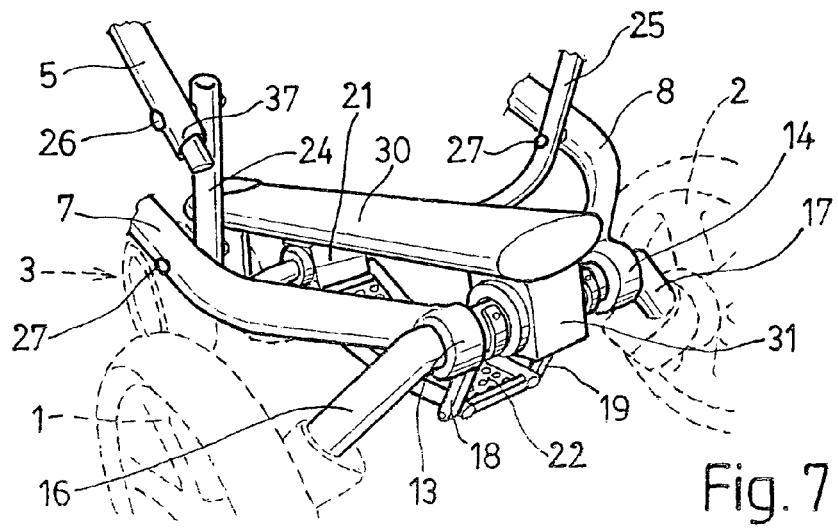

Each of the aforementioned lateral members (7) and (8) inferiorly ends in a respective bush bearing (13) and (14), said bush bearings being both fitted on the central length of the shaft (15) (FIG. 6) being fitted to each of the rear wheels (1) and (2) through a respective inflected length (16) and (17).

Figure 5:
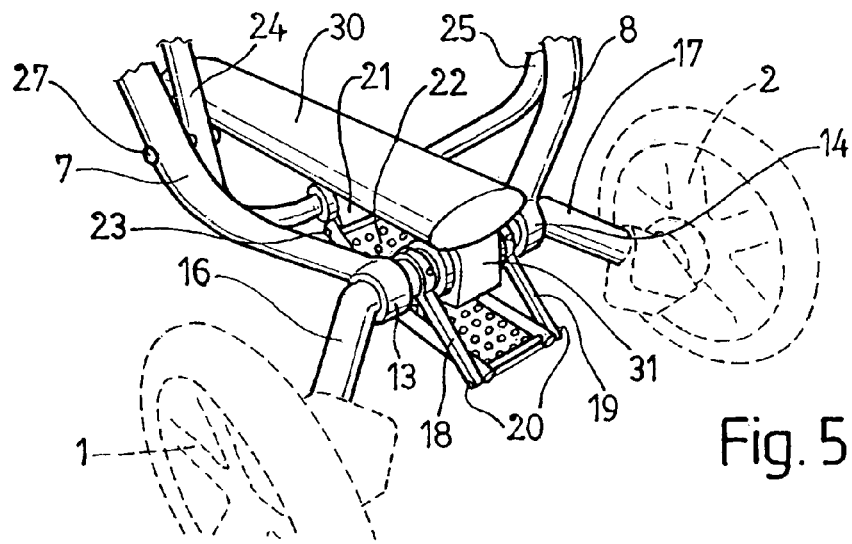
FIGS. 5, 6 and 7 are detail perspective views of the lower rear portion of the chassis.

Two connecting rods (18) and (19) are solidly secured to said central length of the shaft (15) and have their free end (20) (FIG. 5) articulatedly linked to a central support (21) by means of an arcuate plate (2) being at its front end (23) linked in a pin-jointed connection to said central support (21).

This central support (21) makes up an articulated connection with the middle length of a U-shaped member having the end of each of its branches (24) and (25) linked in a pin-jointed connection to the lower end region (26) of the respective branch of the handlebar and an intermediary point of each of its aforementioned branches linked in a pin-jointed connection to the respective one of said lateral members (7) and (8) being related with the rear wheels.

The central support (21) is fitted to and guided by means of an appendage (28) (FIG. 6) along a longitudinal slot (29) being provided at the lower surface of a sill (30) being at its rear end fitted by means of a block bearing (31) to the center of the central length of the shaft (15), the rolling support (3) being fitted to the front end of said sill.

Figure 2:
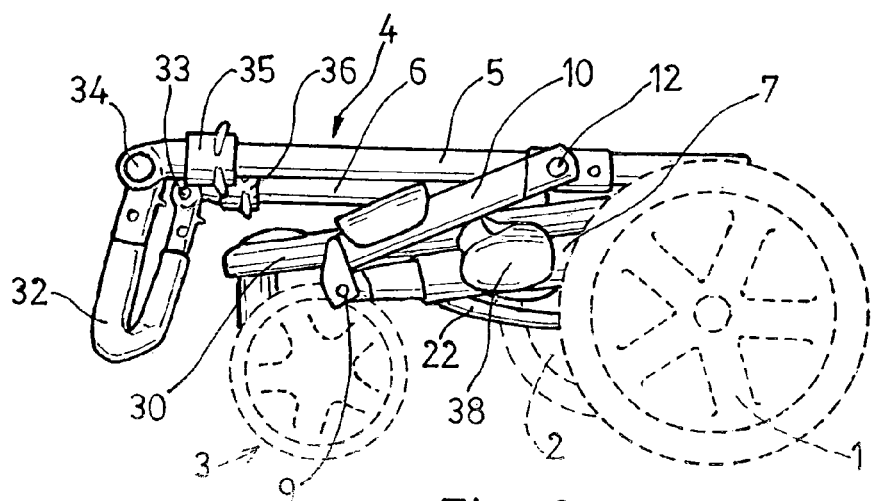
Figure 3:
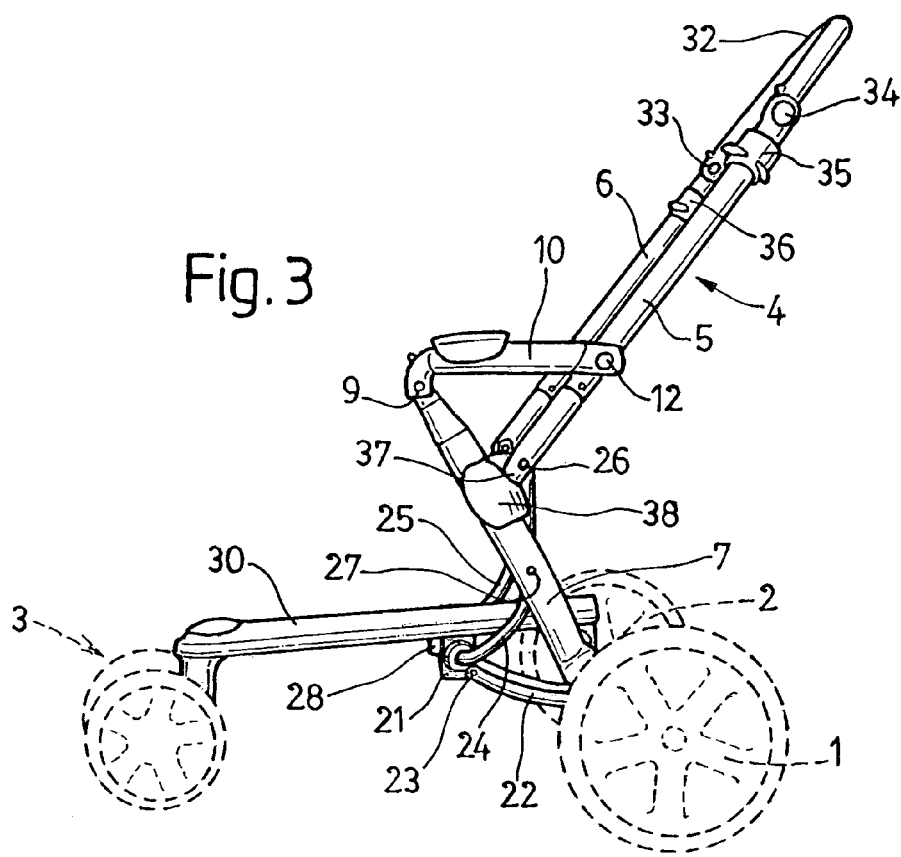
FIGS. 3 and 4 illustrate in a side view this chassis in an unfolded and a half-folded arrangement, respectively.
Figure 4:
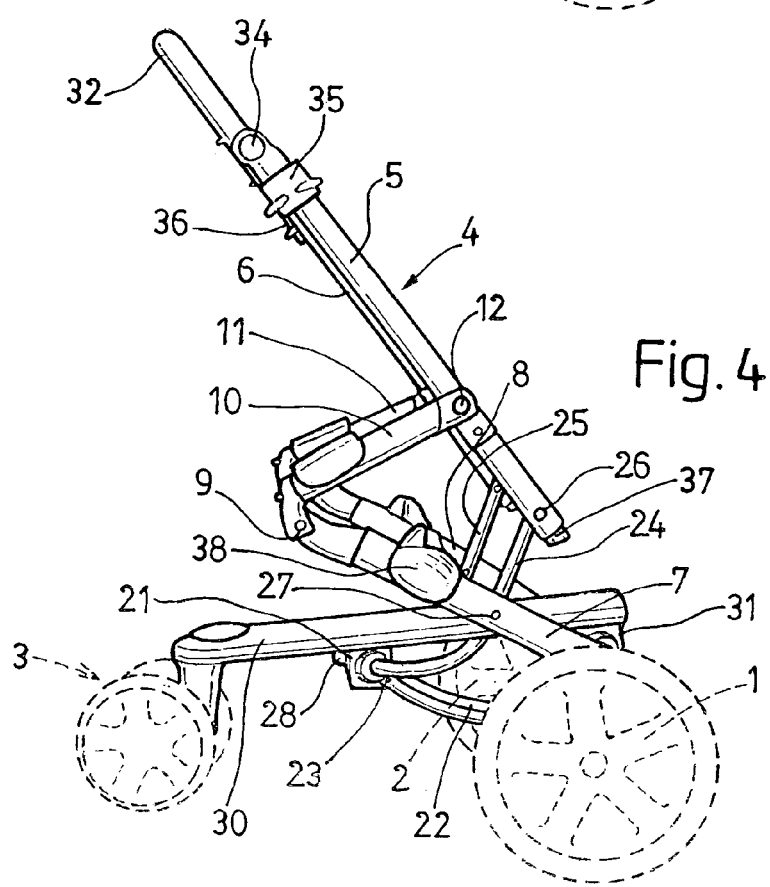

The handlebar (4) comprises a U-shaped handhold (32) being pin-jointedly linked by means of pins (33) (being provided with a locking device (34)) to the aforementioned branches (5) and (6), each of these latter in its upper portion comprising a respective slidable control (35) and (36) being provided for unlocking the fitting of the lower end (37) of said branches in receiver devices (38) being provided at the intermediary point of the lateral members (7) and (8). The articulated arrangement of the handhold (32) contributes to the obtainment of a compactly folded arrangement of the chassis (FIG. 2).

Figure 9:
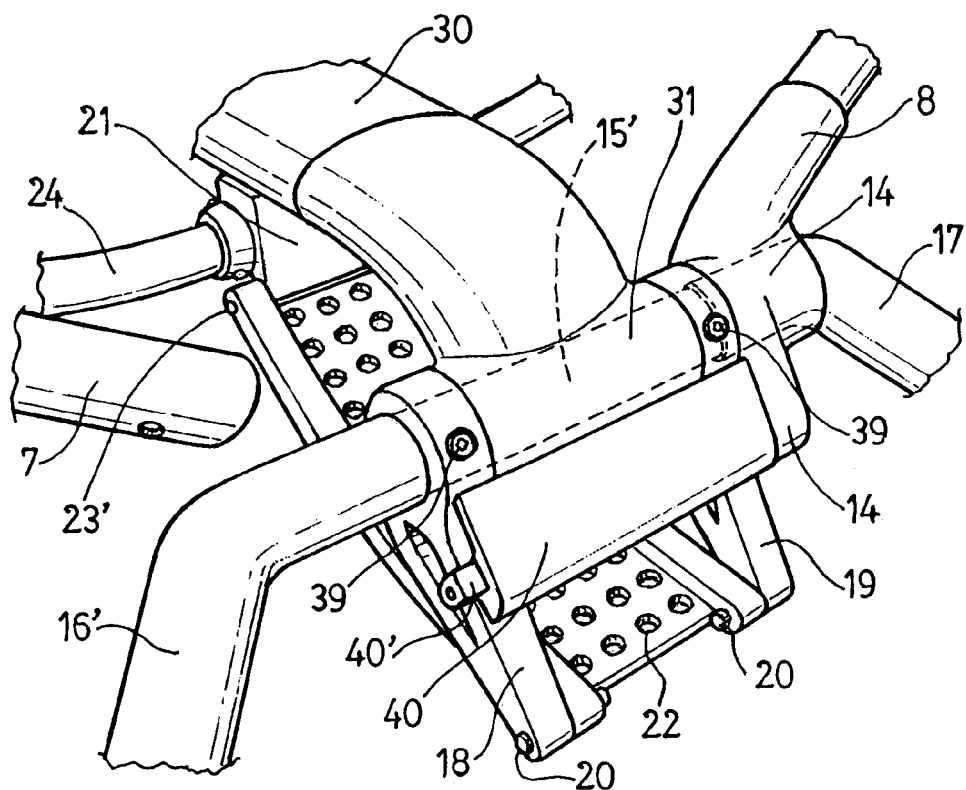
FIG. 9 is a detail perspective view of the makeup of the shaft of the rear wheels and the members being associated to it, of the chassis as per FIG. 8.

According to FIG. 9 the shaft having the rear wheels (1) and (2) fitted to it is made up of a central length (15') having fitted to it two inflected end lengths (16') and (17') being each for each wheel, said fitting being secured by means of the very fastening (39) of the connecting rods (18) and (19) to the shaft, said shaft being securely made up by means of the presence of a cross member (40) being provided for linking the bush bearings (13) and (14) to each other, each of these latter for such a purpose having an appendage (13') and (14') being fit to be fixedly attached to a respective end stub (40') of said cross member.

Figure 10:
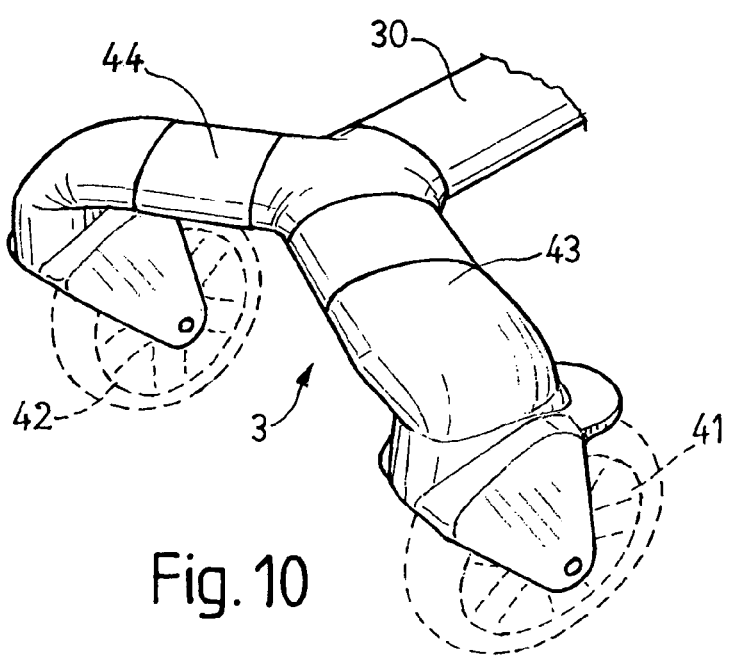
FIG. 10 illustrates in a perspective view the detail of the makeup of the front rolling support with two separate wheels.

According to FIG. 10 the front rolling support (3) comprises two separate wheels (41) and (42) being each supported in a castoring arrangement at a respective arm (43) and (44), said arms laterally deriving from the front end of the center sill (30) in divergently opposite directions.

Figure 8:
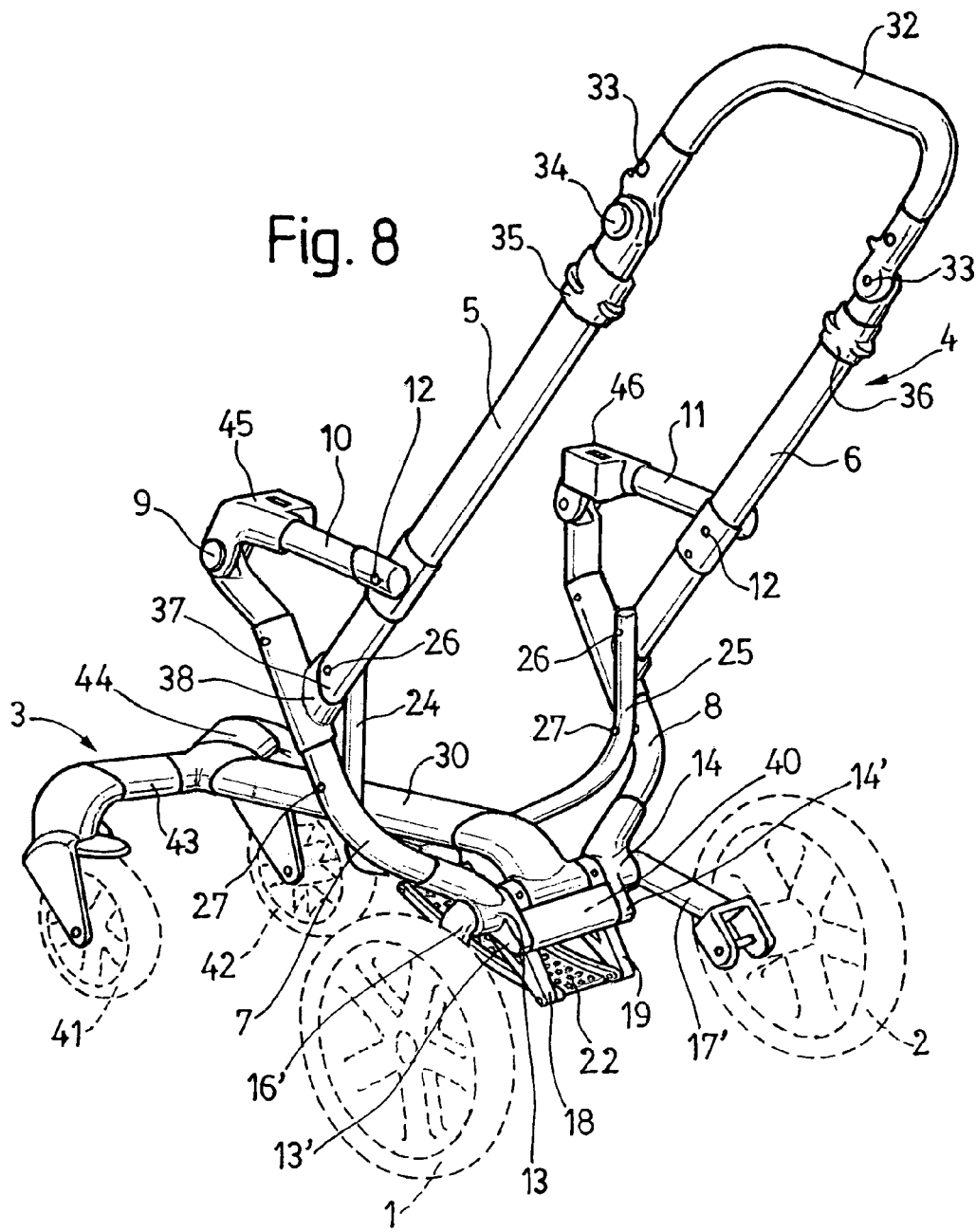
FIG. 8 shows the assembly of this reinforced chassis as seen in a perspective view from the rear.

According to FIG. 8 this chassis at each of the armrests (10) and (11) comprises a respective casing (45) and (46) for receiving the means being provided for fitting the corresponding carrycot seat (not shown), and in order to be used as a pushchair said chassis will be equipped with the corresponding seat, backrest, front railing, footrest, etc., and it will also have the adequate accessories such as the suspension and braking means.

The invention claimed is:

1. A foldable chassis for baby carriages comprising two lateral rear wheels and a centrally arranged front rolling support, and a U-shaped handlebar being at the end of each of its branches removably fitted to an intermediary point of a respective lateral member, said lateral members being each related with its respective rear wheel, each of said lateral members being at its upper end linked in a pin-jointed connection to a respective armrest and, each of said armrests being at its rear portion linked in a pin-jointed connection to the respective branch of the handlebar; wherein each of the lateral members is related with the rear wheels inferiorly ends in a respective bush bearing, said bush bearings being both fitted on the central length of the shaft being fitted to each of the wheels through a respective inflected length, two connecting rods being solidly secured to said central length of said shaft and articulatedly linked to a central support making up an articulated connection with the middle length of a U-shaped member having the end of each of its branches linked in a pin-jointed connection to the end region of the respective branch of the handlebar and an intermediary point of each of its branches linked in a pin-jointed connection to the respective one of said lateral members being related with the rear wheels.

2. A foldable chassis for baby carriages as per claim 1, wherein the central support is fitted to and longitudinally guided along the lower surface of a center sill being at its rear end fitted by a block bearing to the central length of the shaft being fitted to the rear wheels, the rolling support comprising a castoring double wheel being fitted to the front end of said center sill.

3. A foldable chassis for baby carriages as per claim 1, wherein the articulated linkage between the connecting rods and and the central support is carried out with the intermediary of an arcuate plate.

4. A foldable chassis for baby carriages as per claim 1, wherein the shaft having the rear wheels fitted to it comprises a central length having fitted to it two end lengths wherein one of the end lengths is associated with each wheel, said fitting being secured fastening of the connecting rods to the shaft and with the presence of a cross member being provided for linking the bush bearings to each other.

5. A foldable chassis for baby carriages as per claim 1, wherein the front rolling support comprises two separate wheels being each supported by a respective short arm, said arms laterally deriving from the front end of the center sill in opposite directions.

* * * * *